Dec. 10, 1957  G. E. HAMMIT  2,815,976
HOIST ATTACHMENT DEVICE
Filed Jan. 26, 1954  2 Sheets-Sheet 1
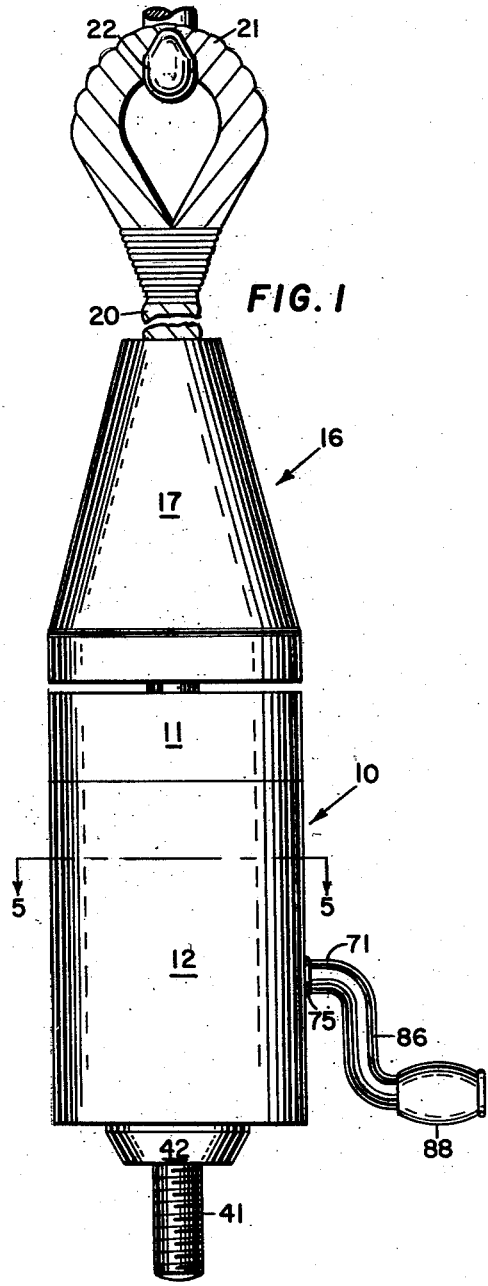
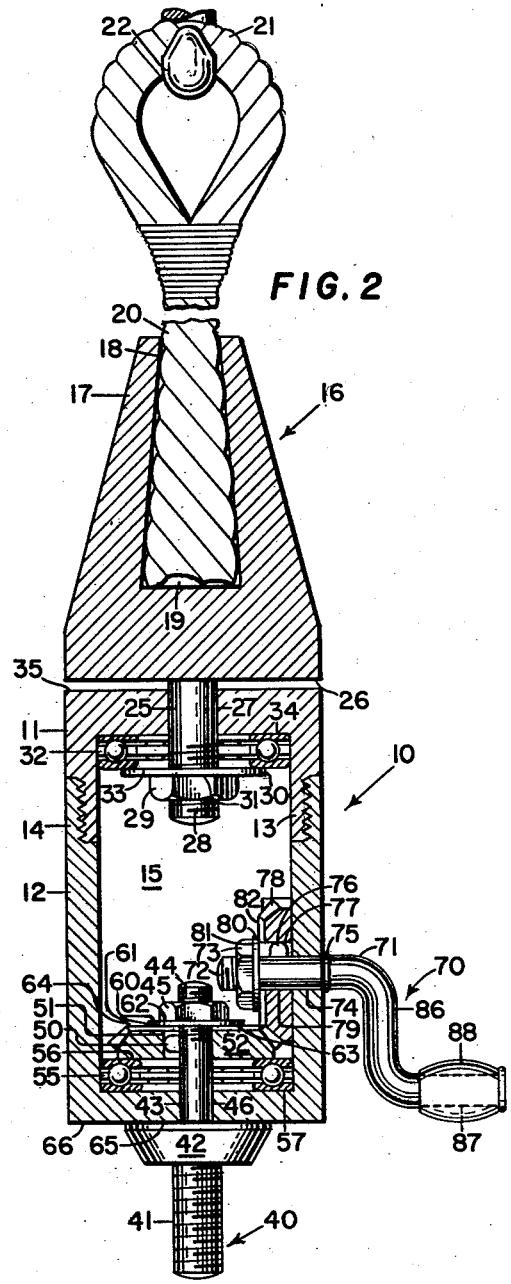
INVENTOR
GRADY E. HAMMIT
BY
ATTORNEYS Dec. 10, 1957  G. E. HAMMIT  2,815,976
HOIST ATTACHMENT DEVICE
Filed Jan. 26, 1954  2 Sheets-Sheet 2

INVENTOR
GRADY E. HAMMIT

BY
ATTORNEYS

United States Patent Office 2,815,976
Patented Dec. 10, 1957

2,815,976

HOIST ATTACHMENT DEVICE

Grady E. Hammit, Chula Vista, Calif.

Application January 26, 1954, Serial No. 406,373

2 Claims. (Cl. 294—82)

(Granted under Title 35, U. S. Code (1952), sec. 266)

The invention described herein may be manufactured and used by or for the Government of the United States of America for governmental purposes without the payment of any royalties thereon or therefor.

The present invention relates to a hoist attachment device, and more particularly to a hoist attachment device employing an arrangement wherein a body means is rotatably supported by a suitable support means and an attaching means is rotatably supported by the body means, an actuating means being provided for selectively operating the attaching means.

The present invention is adapted for use with any type of hoist or lifting crane, and it is especially adapted for use in lifting and lowering aircraft and the like, as for instance when loading and unloading aircraft between a ship and a dock.

Aircraft used aboard aircraft carriers, for example, are provided with a threaded fitting into which a correspondingly threaded portion of a hoist attachment device is screwed. When prior art devices are used, it is necessary to disconnect the attachment from the hoisting hook and rotate the entire attachment in order to screw it into place. The attachment is then reconnected to the hoisting hook and the aircraft may be raised and lowered as required. After the aircraft is suitably positioned and it is desired to remove the attachment, it is again necessary to disconnect the attachment from the hoisting hook and rotate the entire attachment in order to unscrew it from the aircraft. The attachment is then reconnected to the hoisting hook and the operation may be repeated with another aircraft. It is evident that the procedure required with known devices is tedious and time consuming.

Furthermore, when prior art devices are utilized, there is no way of determining when the attachment has been sufficiently screwed into the fitting in the aircraft and is in proper operative position. Since an aircraft may fall when the hoisting attachment is not in proper position, thereby causing possible injury to the aircraft as well as personnel working therewith, known devices are also unsatisfactory from a safety standpoint.

The present invention provides an arrangement wherein it is not necessary to remove the attachment from a hoisting hook at any time during loading operations, and the attachment may be secured to or removed from an aircraft without the necessity of rotating the entire attachment. The device may therefore be quickly and easily operated, saving considerable time and lessening the effort required of personnel working therewith. Means is also provided for indicating when the attachment is in proper operative position relative to an aircraft thereby providing a safety feature for eliminating the possibility of an aircraft falling from the attachment.

An object of the present invention is the provision of a new and novel hoist attachment device which need not be removed from a hoisting hook at any time during hoisting operations.

Another object is to provide a new and novel hoist attachment device wherein it is not necessary to rotate the entire attachment to secure or remove it from an aircraft or the like.

A further object of the invention is the provision of a new and novel hoist attachment device which provides a safety means for indicating when the attachment is in proper operative position.

Still another object is to provide a new and novel hoist attachment device which is simple and inexpensive in construction, yet sturdy and reliable in operation.

Other objects and many of the attendant advantages of this invention will be readily appreciated as the same becomes better understood by reference to the following detailed description when considered in connection with the accompanying drawings wherein:

Fig. 1 is an elevation view of the device in assembled position.

Fig. 2 is a vertical section of the device shown in Fig. 1,

Figure 3:
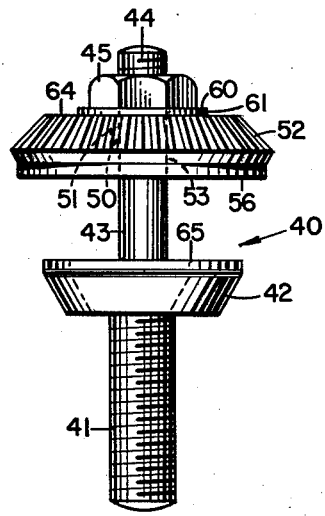
Fig. 3 illustrates the assembly of certain of the components of the device.

Referring now to the drawings, wherein like reference characters designate like or corresponding parts throughout the several views, there is shown in Figs. 1 and 2 a body means indicated generally by numeral 10 and comprising two cylindrical body members 11 and 12 which are secured together by means of complementary screw threads formed on mating flanges 13 and 14 formed integral with the respective body members whereby an enclosed cylindrical cavity or chamber 15 is defined within the body means. A support means indicated generally by numeral 16 comprises a tapered member 17 having a cavity 18 formed therein, the enlarged lower end 19 of a suitable cable 20 being swaged in place within the cavity such that the cable and member 17 are fixed to one another. The upper end of the cable defines an eye portion 21 which is adapted to receive a hook 22 suitably connected to a hoist or lifting crane and the like.

A stud 25 formed integral with the lower surface 26 of member 17 and extending downwardly therefrom is journaled in a complementary opening 27 formed longitudinally through the end wall of body member 11 such that member 11 may rotate with respect to stud 25. The lower end portion of stud 25 is provided with screw threads 28 and a correspondingly threaded clamping means or nut 29 is mounted thereon. A washer 30 abuts the upper surface 31 of the nut and a rotary bearing 32 is interposed between and abuts the upper surface 33 of the washer and the inner surface 34 of the end wall of member 11.

As seen in Fig. 2 wherein the device is shown in assembled position, it should be noted that nut 29 is advanced along stud 25 to a point such that when the attachment is in suspended position as shown, a slight clearance exists between the lower surface 26 of member 17 and the upper surface 35 of member 11. Since body member 11 is mounted on rotary bearing 32, it is apparent that member 11 and the other attachment components supported thereby can freely rotate with respect to the components of the support means.

As most clearly seen in Figs. 2 and 3, an attaching means indicated generally by numeral 40 comprises a threaded end portion 41 which is adapted to be screwed into a correspondingly threaded fitting in an aircraft or the like, and a circumferential flange 42 is formed adjacent the upper end of the threaded portion. Flange 42 is adapted to engage a correspondingly shaped recess formed adjacent the fitting in the aircraft whereby portion 41 is advanced into the threaded portion of the aircraft fitting until flange 42 engages the recessed portion adjacent the fitting whereupon the attachment will be in proper operative position thereby eliminating the possibility of the attachment being improperly secured to the aircraft.

A cylindrical portion 43 of the attaching means is formed integral with flange 42 and has a threaded end portion 44, a correspondingly threaded clamping means or nut 45 being mounted thereon. Portion 43 is journaled in a complementary opening 46 formed longitudinally through the end wall of body member 12 such that the attaching means may rotate with respect to body member 12.

A half-moon key 50 is formed integral with portion 43 and fits within a slot 51 formed in a bevel gear 52, the slot opening into a centrally located hole 53 formed longitudinally through the gear. Hole 53 receives portion 43 such that when gear 52 is placed in operative position as shown in Fig. 2, the gear is rotatably fixed to the attaching means but is axially slidable relative thereto. A slot (not shown) adapted to receive key 50 is formed longitudinally through the end wall of body member 12 and opens into opening 46 whereby key 50 may pass through the slot when it is desired to insert or remove the attaching means 40 from body member 12.

A rotary bearing 55 similar to bearing 32 is interposed between and abuts the lower surface 56 of gear 52 and the inner surface 57 of the end wall of body member 12. The upper surface 60 of a washer 61 abuts the lower surface 62 of nut 45 and the lower surface 63 of the washer abuts the upper surface 64 of bevel gear 52. As seen in Fig. 2 wherein the device is shown in assembled position, it should be noted that nut 45 is advanced along threaded portion 44 to a position where the upper surface 65 of flange 42 is in engagement with the lower surface 66 of member 12, and members 52 and 55 are clamped between surfaces 63 and 57. It is apparent that when the attaching means is in assembled position, it is supported by bearing 55 and may consequently rotate with respect to body member 12. To further reduce friction between the attaching means and member 12, nut 45 may be backed off from the position shown in Fig. 2 such that when the device is in suspended position, a slight clearance exists between surfaces 65 and 66.

Figure 4:
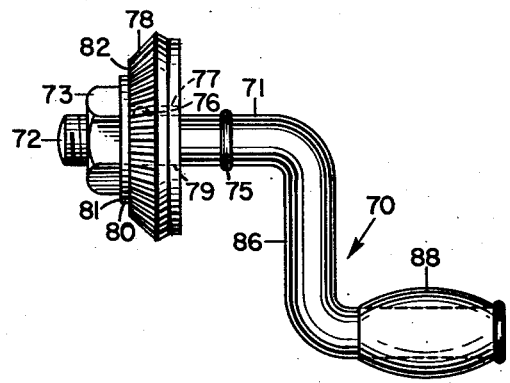
Fig. 4 shows the assembly of certain other components of the device.
Figure 5:
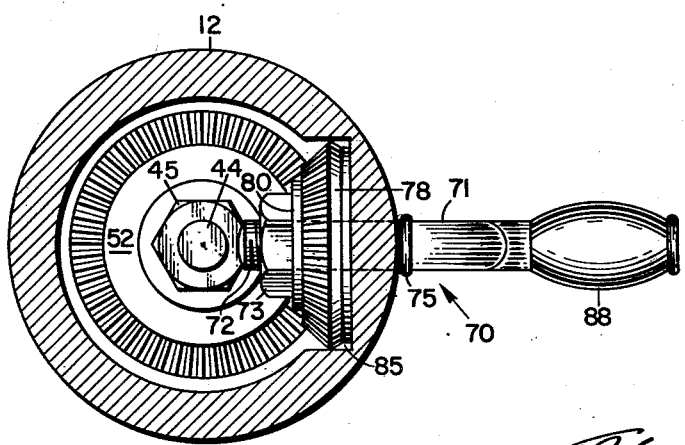
Fig. 5 is a cross-sectional view taken on the line 5—5 of Fig. 1 looking in the direction of the arrows.

Referring to Figs. 2, 4 and 5, an actuating means indicated generally by numeral 70 comprises a cylindrical portion 71 having a threaded end portion 72, a correspondingly threaded clamping means or nut 73 being mounted thereon. Portion 71 is journaled in a complementary opening 74 formed in the side wall of body member 12 and a circumferential flange 75 is formed at an intermediate portion of portion 71 to limit the inward movement thereof within opening 74. A half-moon key 76 is formed integral with portion 71 and fits within a slot 77 formed in a bevel gear 78, the slot opening into a centrally located hole 79 formed longitudinally through the gear. Opening 79 receives portion 71 such that when gear 78 is in operative position as shown in Fig. 2, the gear is rotatably fixed to portion 71 but is axially slidable relative thereto. A washer 80 is interposed between and abuts the lower surface 81 of nut 73 and the upper surface 82 of gear 78. A slot (not shown) adapted to receive key 77 is formed in the side wall of body member 12 and opens into opening 74 whereby key 77 may pass through the slot when it is desired to insert or remove the actuating means 70 from body member 12.

As most clearly seen in Fig. 5, gear 78 is disposed within a recess 85 formed in the inner periphery of member 12 when in operative position whereby gears 52 and 78 are in continuous engagement. In assembling the actuating means as shown, portion 71 is urged inwardly until flange 75 engages the outer periphery of member 12 and nut 73 is advanced until washer 80 engages surface 82 as shown in Figs. 2 and 5 to thereby prevent axial movement of gear 78. Nut 73 is not, however, tightened down to clamp gear 78 within the recess, but washer 80 engages surface 82 only lightly whereby gear 78 may be freely rotated when desired.

Portion 71 is provided with an integral crank arm 86 extending at right angles thereto, and a handle portion 87 is formed at right angles to the crank arm, a handle 88 being mounted thereon such that the handle may be manually grasped and the actuating means selectively rotated.

When the device is in assembled position as shown in Fig. 2, the attachment is lowered until threaded portion 41 is adjacent the fitting in an aircraft. Sufficient slack must be present in the cable supporting hook 22 such that portion 41 may be inserted in the aircraft fitting, whereupon by rotating the actuating means by turning handle 88, portion 41 is advanced into the fitting. Handle 88 is turned until flange 42 engages the correspondingly recessed portion in the aircraft, and the attachment is then in proper operative position. The body means and the attached aircraft may swivel about stud 27 due to their being rotatably supported by bearing 32 whereby the load may be selectively turned by personnel while it is in a suspended position.

Since both bearings and both bevel gears are enclosed within chamber 15, these components are protected from dirt and other foreign particles which might interfere with their proper operation. Furthermore, these components are readily accessible for inspection and repair, since it is merely necessary to unscrew body member 12 from body member 11 to gain access thereto. Each of the bearings and bevel gears may be removed by unscrewing the associated clamping nut, and the entire attaching means, actuating means or support means may similarly be removed.

From the foregoing, it is apparent that there is provided a new and novel hoist attachment device which need not be removed from a hoisting hook at any time during hoisting operations and wherein it is not necessary to rotate the entire attachment to secure or remove it from an aircraft or the like. The device is provided with a safety means for indicating when it is in proper operative position, and it is simple and inexpensive in construction, yet sturdy and reliable in operation.

Obviously many modifications and variations of the present invention are possible in the light of the above teachings. It is therefore to be understood that within the scope of the appended claims the invention may be practiced otherwise than as specifically described.

I claim:

1. A hoist attachment device which comprises an enclosed housing having upper and lower portions, a support means adapted to be connected to a hoist and including a first stud freely extending through the upper portion of said housing, said first stud terminating in a threaded end disposed within the housing, a nut threaded on said stud, a first bearing interposed between the upper portion of said housing and the nut whereby said housing is rotatably supported by the support means, a second stud freely extending through the lower portion of said housing and having a threaded end adapted to be rotatably connected to a load, said second stud having an opposite threaded end extending into said housing, a nut threaded on said second stud, a first bevel gear disposed within the housing and keyed to said second stud so as to rotate therewith, a second bearing interposed between second bevel gear and the lower portion of said housing whereby said second stud is rotatably supported to the housing, a third stud freely extending through said housing and terminating therein in a threaded end provided with a nut, a second bevel gear keyed to the third stud so as to rotate therewith and being in meshing engagement with the first bevel gear, said third stud terminating in the other end in a handle exterior of the housing whereby the second stud can be rotated for engagement with the load, said second stud having a flange for limiting rotation of the second stud to the load.

2. A hoist attachment comprising an enclosed housing having upper and lower wall portions, a first stud extending through the upper wall portion of said housing, retaining means carried by said first stud within said housing, an annular bearing between said retaining means and the upper wall of said housing such that said housing is rotatably supported by said first stud through said bearing and retaining means, a second stud extending through the lower wall portion of said housing, the respective axes of said two studs being essentially parallel, the outer end of said second stud being adapted for threadable engagement with a load to be hoisted, a manually operable crank having a shaft extending through a wall of said housing, the axis of rotation of said crankshaft being generally perpendicular to the parallel axes of said two studs, and a gear train within said housing operably connecting the inner end of said second stud to the inner end of said crankshaft, such that, upon manual actuation of said crank, said second stud will be rotated to effect threadable engagement between the outer end of said second stud and said load.

References Cited in the file of this patent

UNITED STATES PATENTS

| | | |
|---|---|---|
| 180,107 | Burr | July 25, 1876 |
| 497,664 | Hodgkinson | May 16, 1893 |
| 721,801 | Hooker | Mar. 3, 1903 |
| 827,795 | Foucher | Aug. 7, 1906 |
| 1,166,382 | Morse | Dec. 28, 1915 |
| 1,532,150 | Olson | Apr. 7, 1925 |
| 1,773,045 | Koons | Aug. 12, 1930 |
| 1,891,832 | Parks | Dec. 20, 1932 |
| 2,583,266 | Jenson | Jan. 22, 1952 |
| 2,674,485 | Jamison | Apr. 6, 1954 |
| 2,712,932 | Gould | July 12, 1955 |